United States Patent [19]

Treutler et al.

[11] Patent Number: 5,703,287
[45] Date of Patent: Dec. 30, 1997

[54] MEASURING ELEMENT FOR A FLOW SENSOR

[75] Inventors: Christoph Treutler, Wannweil; Rolf Benz, Reutlingen; Horst Muenzel, Reutlingen; Steffen Schmidt, Reutlingen; Eckart Reihlen, Reutlingen; Andreas Lock, Reutlingen, all of Germany

[73] Assignee: Robert Bosch GmbH, Stuttgart, Germany

[21] Appl. No.: 622,717

[22] Filed: Mar. 26, 1996

[30] Foreign Application Priority Data

Mar. 29, 1995 [DE] Germany .................. 1 95 11 590.2

[51] Int. Cl.$^6$ ........................................ G01F 1/68
[52] U.S. Cl. ........................................ 73/204.26
[58] Field of Search .................... 73/204.26, 204.22, 73/204.15

[56] References Cited

U.S. PATENT DOCUMENTS 4,888,988  12/1989  Lee et al. .................. 73/204.26
4,952,904   8/1990  Johnson et al. ................ 338/36

Primary Examiner—Richard Chilcot
Assistant Examiner—Jewel Artis
Attorney, Agent, or Firm—Kenyon & Kenyon

[57] ABSTRACT

In a measuring element for a flow sensor and a method for manufacturing the measuring element, a heater, a temperature sensor, and a printed circuit trace are patterned out of a platinum layer. Furthermore, an interconnection region is used for contacting the measuring chip with bonding wires. An additional metal layer is provided for the interconnection region.

7 Claims, 1 Drawing Sheet

MEASURING ELEMENT FOR A FLOW SENSOR

BACKGROUND OF THE INFORMATION

U.S. Pat. No. 4,888,988 describes a measuring element for a flow sensor, in which a dielectric membrane is retained by a frame of monocrystalline silicon. A patterned metal layer is provided on the measuring element, a heater, temperature sensors, printed circuit traces and interconnection regions being patterned out of the metal layer. Platinum is indicated, inter alia, as a material for the metal layer.

U.S. Pat. No. 4,952,904 describes a measuring element for a flow sensor, in which a dielectric bridge structure is retained by a silicon substrate. A heater and temperature sensors, which are patterned out of a platinum layer, are provided on the bridge structure. Also provided are printed circuit traces, which are likewise patterned out of the platinum layer. A silicon nitride layer is used for the bridge structure. Intermediate layers of metal oxide are provided to ensure satisfactory adhesion of the platinum on the nitride layer. Also discussed is the necessity of subjecting the platinum temperature sensors to a temperature treatment to achieve suitable properties for the temperature sensors. Temperatures of over 450° C. are supposed to be used for this temperature treatment. At these temperatures, platinum films that do not have an adhesion-promotor layer are destroyed. Also, at these temperatures, metals cannot be used as adhesion layers, since they diffuse into the platinum and adversely affect the properties of the platinum temperature sensors.

SUMMARY OF THE INVENTION

The advantage of the measuring element or the manufacturing method according to the present invention is that thin, high-grade platinum layers are used for the measuring element and, at the same time, there can be an excellent contacting of the interconnection regions with bonding wires. Thus, a high-grade measuring element with good long-term stability is created. The additional process steps required for this entail exclusively standard process steps, which are well known from semiconductor manufacturing.

The additional metal layer can be disposed either on the platinum layer or underneath the platinum layer. It is also possible to provide the metal layer for the interconnection region at a spot where the platinum layer has been removed. The passivation layer makes it possible for the platinum layer to be annealed at higher temperatures. In addition, the thus completed measuring element is protected from damage. Because of its good thermal conductivity and its simple processing properties (writing patterns), silicon is well suited for manufacturing the measuring elements. Membrane layers and passivation layers of silicon oxide, silicon nitride or combinations of the two substances can be used quite simply with this material.

DETAILED DESCRIPTION

Figure 1:
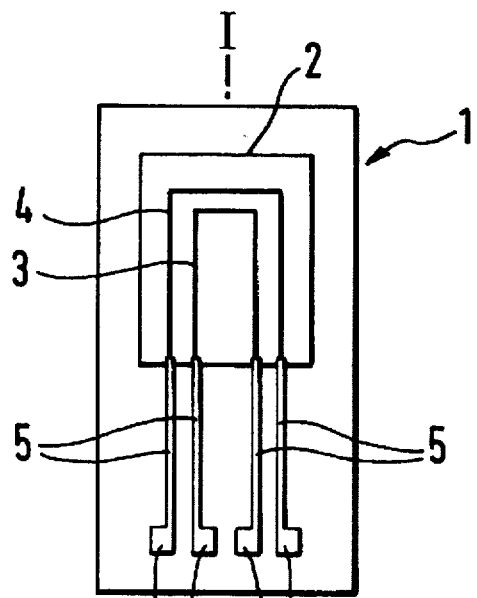
FIG. 1 shows a plan view of a measuring element according to the present invention.

FIG. 1 depicts a schematic plan view of a measuring element 1. The measuring element 1 has a membrane 2 on which are arranged a heater 3 and a temperature sensor 4. The heater 3 and the temperature sensor 4 are connected via printed circuit traces 5 with interconnection regions (bonding pads). Thus, by applying bonding wires to the interconnection regions 6, an electric current flow can be sent through the heater 3, or the measuring signal from the temperature sensor 4 can be read out.

Sensors of this type are described by U.S. Pat. Nos. 4,888,988 and 4,952,904. FIG. 1 is merely a schematic representation. Thus, for example, as described in the above-mentioned patents, a plurality of temperature sensors 4 or a plurality of heaters 3 are used. In the case of the sensor according to the present invention, the printed circuit traces 5, the heater 3, and the temperature sensor 4 are patterned out of one and the same platinum layer. Moreover, in accordance with the state of the art, the interconnection regions 6 are also still patterned out of the same layer.

Figure 2:
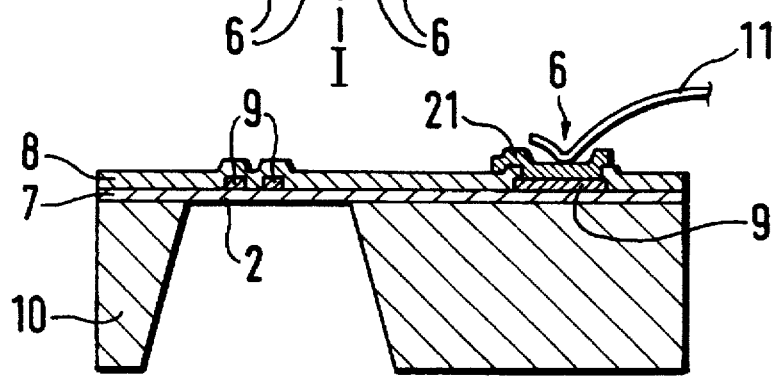
FIG. 2 illustrates a first exemplary embodiment of the measuring element according to the present invention.
Figure 3:
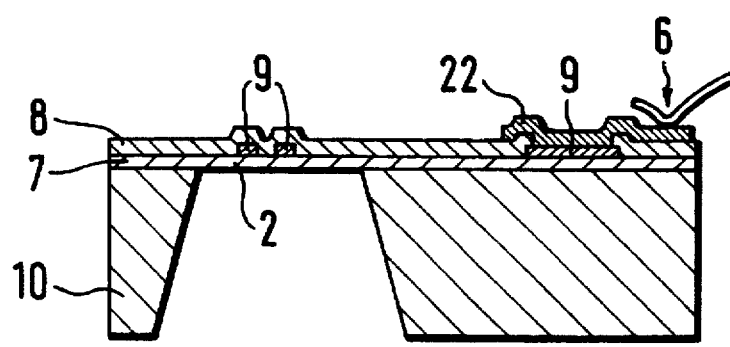
FIG. 3 illustrates a second exemplary embodiment of the measuring element according to the present invention.
Figure 4:
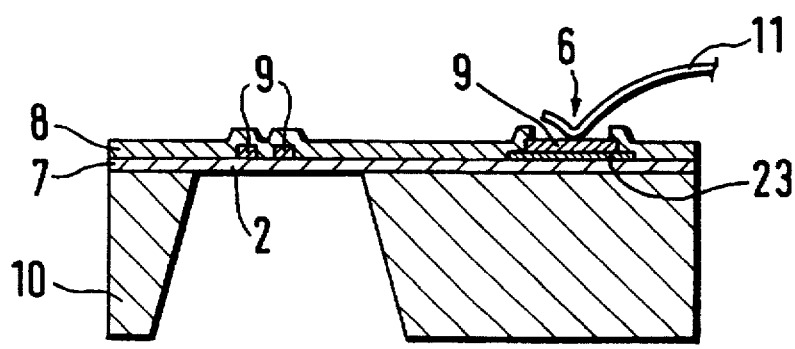
FIG. 4 illustrates a third exemplary embodiment of the measuring element according to the present invention.

FIGS. 2 through 4 each show a section through a sensor element according to the present invention which corresponds to a section through the line I—I of FIG. 1. However, the size proportions are not accurately shown, in particular, the thicknesses of layers 7, 8 and 9 are exaggerated.

A first exemplary embodiment is shown in FIG. 2. For the measuring element 1, a membrane layer 7 is applied to a silicon substrate (base material) 10. The geometric dimensions of the membrane 2 are defined by the dimensions of the opening etched into the silicon substrate 10. A patterned platinum layer 9 is then produced on the membrane layer 7, defining at least one heater, at least one temperature sensor and interconnect traces. A passivation layer 8 is then produced on this. The other patterned metal layer 21 then defines the interconnection region 6, on which are provided bonding wires 11 for contacting the platinum layer 9, i.e., of the heater 3 and of the temperature sensor 4.

The measuring element 1 is manufactured using the methods known from the prior art mentioned at the outset. A membrane layer 7 is first deposited onto the silicon substrate 10. It is especially beneficial to first oxidize the silicon substrate 10 on the surface, to then apply a nitride layer, and subsequently to once more produce a thin oxide layer. A platinum layer is then formed on this membrane layer 7, initially over the entire surface, by means of vapor or sputter deposition. The individual structures, such as the heater 3, temperature sensors 4, and printed circuit traces 5 are then produced out of the platinum layer 9 by means of photolithography and etching. A passivation layer 8, such as silicon oxide or silicon nitride, is then deposited in another process step, so that the entire surface is covered with this layer. An annealing step then follows for aftertreatment of the platinum layer 9. This annealing step is described in detail below. Openings are then introduced at individual locations in the passivation layer 8, through which the platinum layer 9 is then laid bare again at individual locations. The further metallization (plating) 21 is then produced, for example, by means of sputter deposition and patterning. The membrane 2 is defined in that at any desired instant, preferably, however, as the last process step named here, a recess is etched into the silicon substrate.

Following assembly of the measuring element 1 in a housing, the contacting of the interconnection regions 6 then takes place, i.e., of the heater and of the temperature sensor through bonding wires 11. This is achieved in that a thin bonding wire, typically on the order of 50 μm diameter, is attached to the interconnection region 6 by a typical bonding method, such as ultrasonic bonding or thermosonic bonding (combined thermocompression and ultrasonic bonding) methods. Because of the special demands placed on the platinum layer 9 when it is used as a measuring element for a flow sensor, the bonding wires 11 cannot be directly secured to the platinum layer 9. During operation of the sensor, the membrane 2 is heated by the heater 3 and cooled by air flowing past. This cooling is verified in that the temperature sensor 4 measures the temperature of the membrane. To measure temperature, the platinum temperature sensor uses the temperature dependence of the resistance (TKR) of the platinum. The TKR of sputter- or vapor-deposited platinum is initially insufficient and changes with time. To elevate the TKR of the platinum layer and to stabilize it over time, an annealing step is provided, in which temperatures of over 600° C. are used to anneal the platinum layer.

As described by U.S. Pat. No. 4,952,905, at appropriate temperatures, all conventional adhesion-promotor metals diffuse into the platinum and have an unwanted effect on the TKR. U.S. Pat. No. 4,952,905 proposes using adhesion layers of metal oxides; however, they are expensive to manufacture and an outdiffusion of the materials used into the platinum cannot be ruled out.

Therefore, the present invention proposes using other metal layers that are disposed, however, only in the area of the interconnection regions 6. Since the printed circuit traces 5, which cover a relatively sizable distance, are arranged between the interconnection regions 6 and the actual measuring elements on the membrane, the additional metallization 21 in the interconnection region 6 does not affect the TKR of the temperature measuring elements on the membrane 2. Furthermore, the annealing of the platinum layer 9 takes place prior to application of the additional metallization 21.

The bonding wires 11 cannot be applied directly to the platinum layer 9 since the platinum layer 9 is very thin and its adhesion to the substructure does not suffice for the irregular stressing of the bonding operation. When, as shown in FIG. 2, the further metallization 21 is arranged directly over a platinum layer 9, the forces acting on the bonding site during bonding or later operation of the sensor are distributed over a larger surface. As a result, the mechanical stressing of the interconnection of the platinum layer 9 and the membrane layer 7 is reduced.

FIG. 3 illustrates another exemplary embodiment, which digresses somewhat from FIG. 2 by a differently configured interconnection region 6. Here, the interconnection region 6 is formed by another metallization 22, the passivation layer 8 being situated directly underneath the interconnection region 6. The further metallization is then brought on the surface of the passivation up to an opening in the passivation layer 8, where a contacting of the platinum printed circuit traces 5 or 9 then follows. This interconnection region 6 then corresponds to that which is known from semiconductor technology as a standard interconnection region, and features an especially good attachment of the bonding wire 11 to the interconnection region 6.

FIG. 4 illustrates another exemplary embodiment, which digresses somewhat from FIGS. 2 and 3 by a differently configured interconnection region 6. In FIG. 4, the bonding region 6 is formed by another metal layer 23 situated directly on the membrane layer 7 and the platinum layer 9 situated above it. The bonding wire 11 is then attached directly to the platinum layer 9. The additional metal layer 23 effects an improved adhesion of the platinum layer 9 in the interconnection region 6, so that a bonding wire 11 can then be attached directly to the platinum layer 9. In so doing, however, the additional metal layer 23 is only provided directly under the interconnection regions 6 in order to prevent the TKR of the platinum layer on the membrane 2 from being adversely affected during the necessary annealing process. Because the spatial distance between the membrane 2 and the interconnection regions 6 is so great, any adverse effect to the TKR of the heater 3 and of the temperature sensor 4 is thus avoided. As metallic adhesion layers, one thinks here of titanium, titanium tungsten, chromium, tantalum oxide, chromium tungsten, aluminum, nickel, metal silicides (Pt-Si) or of multilayered arrangements of the metallizations mentioned. As metals suitable for use for the other metallizations 21, 22, on which the bonding wire is directly attached, one thinks of all metals having good bonding properties, such as aluminum or nickel.

During the annealing treatment with temperatures of >600° C., the platinum layer is subjected to considerable stress. This is also due to the fact that, at 100 to 200 nm, the platinum layer is quite thin. As described in U.S. Pat. No. 4,952,904, films of this type tend to become loosened from the substructure at temperatures above 450° C. It turns out, however, that platinum layers of this type can be annealed with temperatures of between 600° and 700° C., when the annealing step takes place after the passivation layer 8 is applied. Therefore, when working with the sensors shown here, the annealing step takes place in the process stage in which the entire surface of the measuring element is covered with the passivation layer 8, i.e., prior to introducing openings in the passivation layer 8, which are supposed to allow a contacting of the printed circuit traces. In addition, it turns out that the platinum layer 9 adheres better to the membrane layer 7 when at least its surface has a certain silicon oxide content. This can be achieved by a thin silicon oxide film or by admixing oxygen, i.e., by means of a silicon-oxide-nitride film. A TKR of about 2500 ppm/K (measuring range 25° C. to 125° C.) was able to be achieved through the application of annealing temperatures of up to 700° C.

What is claimed is:

1. A measuring element for a flow sensor, the measuring element attaching to a bonding wire, comprising:
   a membrane;
   a platinum layer;
   at least one heater arranged on the membrane;
   at least one temperature sensor arranged on the membrane, the temperature sensor being patterned out of the platinum layer;
   at least one printed circuit trace for contacting the heater and the temperature sensor, the printed circuit trace being patterned out of the platinum layer; and
   an interconnection region for attaching to the bonding wire, the interconnection region including a metal layer composed of a metal other than platinum.

2. The measuring element according to claim 1, further comprising a silicon substrate having an applied membrane layer.

3. The measuring element according to claim 2, further comprising a passivation layer arranged on the membrane layer.

4. The measuring element according to claim 3, wherein the membrane layer and the passivation layer include silicon, oxygen and nitrogen.

5. The measuring element according to claim 2, wherein the metal layer is arranged on the platinum layer.

6. The measuring element according to claim 2, wherein the metal layer is arranged between the platinum layer and the membrane layer.

7. The measuring element according to claim 1, wherein the metal layer is arranged on a surface of the measuring element in electrical contact with the printed circuit trace and the platinum layer is removed, in the interconnection region.

* * * * *